(12) United States Patent
Ryan

(10) Patent No.: US 10,966,421 B2
(45) Date of Patent: Apr. 6, 2021

(54) METHOD AND DEVICE FOR COLLECTING AND PRESERVING CELLS FOR ANALYSIS

(75) Inventor: Wayne L. Ryan, Omaha, NE (US)

(73) Assignee: Streck, Inc., LaVista, NE (US)

( * ) Notice: Subject to any disclaimer, the term of this patent is extended or adjusted under 35 U.S.C. 154(b) by 2112 days.

(21) Appl. No.: 10/605,669

(22) Filed: Oct. 16, 2003

(65) Prior Publication Data

US 2004/0137417 A1 Jul. 15, 2004

Related U.S. Application Data

(60) Provisional application No. 60/418,978, filed on Oct. 16, 2002.

(51) Int. Cl.
| | | |
|---|---|---|
| *A01N 1/02* | (2006.01) | |
| *B01L 3/00* | (2006.01) | |
| *B01L 1/00* | (2006.01) | |

(52) U.S. Cl.
CPC .......... *A01N 1/0226* (2013.01); *B01L 3/5082* (2013.01); *B01L 1/52* (2019.08); *B01L 2200/16* (2013.01)

(58) Field of Classification Search
CPC .......... A01N 1/02; A01N 43/36; A01N 47/28; G01N 1/30; G01N 2291/02475; G01N 33/56972; A61B 10/02
See application file for complete search history.

(56) References Cited

U.S. PATENT DOCUMENTS

| | | |
|---|---|---|
| 1,432,249 A | 10/1922 | Robert |
| 1,922,799 A | 8/1933 | Gaus |

(Continued)

FOREIGN PATENT DOCUMENTS

| | | |
|---|---|---|
| CA | 2406463 | 1/2001 |
| DE | 19928820 | 6/1999 |

(Continued)

OTHER PUBLICATIONS

Sigma-Aldrich. "1-Aza-3,7-dioxabicyclo[3.3.0]octane-5-methanol solution." Available online at <www.sigmaaldrich.com/catalog/product/aldrich/417807?lang=en&region=US>. 1 page. Accessed Jan. 13, 2014.*

(Continued)

*Primary Examiner* — Sharmila G Landau
*Assistant Examiner* — Stephanie A McNeil
(74) *Attorney, Agent, or Firm* — The Dobrusin Law Firm, PC

(57) ABSTRACT

The claimed subject matter comprises a device to collect and preserve cells comprising of: (1) a collection container comprised of a tube having an open end and a closed end, a closure in the open end of the tube, a vacuum drawn to a predetermined level inside the container; and (2) compounds including an anticoagulant agent and a fixative agent, wherein the compounds are in a sufficient amount to preserve said cells' original morphology and antigenic sites without significant dilution of said cells, and thereby allowing said cells to be directly analyzed by a flow cytometer without further treatment. The claimed subject matter further comprises a method of making a collection device for cells comprising of: (1) providing a tube having an open end and a closed end; (2) preloading compounds including: an anticoagulant agent, and a fixative agent into the tube, wherein the compounds are in a sufficient amount to preserve the cells' original morphology and antigenic sites without significant dilution of the cells, and thereby allowing the cells to be directly analyzed by a flow cytometer without further treatment; (3) inserting a closure into the open end of the tube; and (4) drawing a vacuum inside the tube to a predetermined level to form the collection device.

20 Claims, 2 Drawing Sheets

(56) References Cited

U.S. PATENT DOCUMENTS

| | | | |
|---|---|---|---|
| 2,250,666 A | 7/1941 | Webb | |
| 2,690,624 A | 10/1954 | Phillips | |
| 2,930,570 A | 3/1960 | Leedy | |
| 3,781,120 A | 12/1973 | Engelhardt | |
| 3,867,521 A * | 2/1975 | Miskel et al. | 424/457 |
| 3,872,730 A | 3/1975 | Ringrose et al. | |
| 3,874,384 A * | 4/1975 | Deindoerfer | A61J 1/10 |
| | | | 424/529 |
| 3,879,295 A * | 4/1975 | Glover et al. | 210/516 |
| 3,973,913 A * | 8/1976 | Louderback | 436/11 |
| 3,994,085 A | 11/1976 | Groselak et al. | |
| 4,043,453 A | 8/1977 | Greenlee | |
| 4,318,090 A | 3/1982 | Narlow et al. | |
| 4,513,522 A | 4/1985 | Selenke | |
| 4,515,890 A * | 5/1985 | Manderino et al. | 435/7.4 |
| 4,579,759 A | 4/1986 | Breuers | |
| 4,584,219 A | 4/1986 | Baartmans | |
| 4,675,159 A | 6/1987 | Al-Sioufi | 422/36 |
| 4,884,827 A | 12/1989 | Kelley | |
| 4,921,277 A | 5/1990 | McDonough | |
| 5,000,484 A | 3/1991 | Phelan et al. | |
| 5,060,672 A | 10/1991 | Sandor et al. | |
| 5,110,908 A * | 5/1992 | Deich et al. | 530/403 |
| 5,135,125 A | 8/1992 | Andel et al. | |
| 5,196,182 A | 3/1993 | Ryan | |
| 5,213,765 A | 5/1993 | Kasai et al. | |
| 5,250,438 A | 10/1993 | Ryan | |
| 5,257,633 A | 11/1993 | Vogler et al. | |
| 5,260,048 A | 11/1993 | Ryan | 435/40.5 |
| 5,343,647 A | 9/1994 | Bulka | |
| 5,366,249 A | 11/1994 | Diemert | |
| 5,447,842 A | 9/1995 | Simons | |
| 5,457,024 A | 10/1995 | Goldbard | |
| 5,459,073 A | 10/1995 | Ryan | |
| 5,459,253 A | 10/1995 | Wolin et al. | |
| 5,460,797 A | 10/1995 | Ryan | |
| 5,468,022 A | 11/1995 | Linder et al. | |
| 5,490,658 A | 2/1996 | Coward et al. | |
| 5,501,954 A | 3/1996 | Mahr | |
| 5,512,343 A | 4/1996 | Shaw | |
| 5,540,358 A | 7/1996 | Wiles et al. | |
| 5,560,657 A | 10/1996 | Morgan | |
| 5,614,391 A | 3/1997 | Franciskvoich et al. | |
| 5,618,664 A | 4/1997 | Kiessling | |
| 5,629,147 A | 5/1997 | Asgari | |
| D382,343 S | 8/1997 | Wandell et al. | |
| 5,654,054 A | 8/1997 | Tropsha | |
| 5,688,516 A | 11/1997 | Raad | |
| 5,731,156 A | 3/1998 | Golbus | |
| 5,783,093 A | 7/1998 | Holme | |
| 5,811,099 A | 9/1998 | Ryan | |
| 5,817,519 A * | 10/1998 | Zelmanovic et al. | 436/63 |
| 5,849,517 A | 12/1998 | Ryan | |
| 5,858,699 A | 1/1999 | Granger et al. | 435/40.51 |
| 5,861,253 A | 1/1999 | Asgari et al. | |
| 5,906,744 A * | 5/1999 | Carroll et al. | 210/516 |
| 5,962,234 A | 10/1999 | Golbus | |
| 5,976,014 A | 11/1999 | Petrick et al. | |
| 5,977,153 A | 11/1999 | Camiener | 514/392 |
| 5,985,572 A | 11/1999 | Macfarlane | |
| 6,013,240 A | 1/2000 | Behr et al. | |
| 6,030,767 A | 2/2000 | Wagner | |
| 6,043,032 A | 3/2000 | Yamagishi et al. | |
| 6,072,086 A | 6/2000 | James et al. | |
| 6,074,827 A | 6/2000 | Nelson | |
| 6,077,235 A | 6/2000 | Serpentino et al. | |
| 6,125,563 A | 10/2000 | Girerd | |
| 6,128,840 A | 10/2000 | Biosvert | |
| 6,168,922 B1 | 1/2001 | Harvey et al. | |
| 6,177,163 B1 | 1/2001 | Block et al. | |
| 6,190,609 B1 | 2/2001 | Chapman | |
| 6,197,539 B1 | 3/2001 | Granger et al. | 435/40.5 |
| 6,197,540 B1 | 3/2001 | Granger et al. | 435/40.51 |
| 6,210,889 B1 | 4/2001 | Drouin et al. | |
| 6,218,531 B1 | 4/2001 | Ekenberg | |
| 6,251,638 B1 | 6/2001 | Umansky et al. | |
| 6,258,540 B1 | 7/2001 | Lo et al. | |
| 6,287,820 B1 | 9/2001 | Umansky et al. | |
| 6,337,189 B1 | 1/2002 | Ryan | |
| 6,365,362 B1 | 4/2002 | Terstappen et al. | |
| 6,527,242 B1 | 3/2003 | Kennedy | |
| 6,527,957 B1 | 3/2003 | Deniega | |
| 6,551,267 B1 | 4/2003 | Cohen et al. | |
| 6,560,847 B2 | 5/2003 | Ohlsson | |
| 6,579,672 B1 | 6/2003 | Granger et al. | 435/2 |
| 6,581,973 B2 | 6/2003 | Levine et al. | |
| 6,602,718 B1 | 8/2003 | Augello et al. | |
| 6,617,170 B2 | 9/2003 | Augello et al. | |
| 6,617,180 B1 | 9/2003 | Wang | |
| 6,623,983 B1 | 9/2003 | Terstappen et al. | |
| 6,630,301 B1 | 10/2003 | Gocke et al. | |
| 6,645,731 B2 | 11/2003 | Terstappen et al. | |
| 6,664,056 B2 | 12/2003 | Lo et al. | |
| 6,759,217 B2 | 7/2004 | Kopreski et al. | |
| 6,821,789 B2 | 11/2004 | Augello et al. | |
| 6,860,513 B2 | 3/2005 | Kaufman | |
| 6,884,573 B2 | 4/2005 | Fischer | |
| 6,916,634 B2 | 7/2005 | Kopreski | |
| 6,939,671 B2 | 9/2005 | Kopreski | |
| 6,994,790 B2 | 2/2006 | Corbin | |
| 7,022,478 B2 | 4/2006 | Rainer et al. | |
| 7,044,941 B2 | 5/2006 | Mathias | |
| 7,208,275 B2 | 4/2007 | Gocke et al. | |
| 7,267,980 B1 | 9/2007 | Mortari et al. | |
| 7,282,371 B2 | 10/2007 | Helftenbein | |
| 7,288,380 B1 | 10/2007 | Gocke et al. | |
| 7,318,293 B2 | 1/2008 | Ardern | |
| 7,332,277 B2 | 2/2008 | Dhallan | |
| 7,332,288 B2 | 2/2008 | Terstappen et al. | |
| 7,358,039 B2 | 4/2008 | Fischer | |
| 7,390,663 B2 | 6/2008 | Ryan et al. | |
| 7,398,999 B2 | 7/2008 | Kaufman | |
| 7,419,832 B2 | 9/2008 | Hunsley | |
| 7,442,506 B2 | 10/2008 | Dhallan | |
| 7,445,901 B2 | 11/2008 | Kudlicki et al. | |
| 7,478,513 B2 | 1/2009 | Baldwin | |
| 7,569,350 B2 | 8/2009 | Gocke et al. | |
| 7,651,838 B2 | 1/2010 | Paterlini-Brechot | |
| 7,767,460 B2 | 8/2010 | Hunsley et al. | |
| 8,586,306 B2 | 11/2013 | Fernando | |
| 9,040,255 B2 | 5/2015 | Tsinberg | |
| 9,120,849 B2 | 9/2015 | Chiklis et al. | |
| 9,127,048 B2 | 9/2015 | Chiklis et al. | |
| 10,091,984 B2 | 10/2018 | Fernando | |
| 2001/0018192 A1 | 8/2001 | Terstappen et al. | |
| 2001/0049895 A1 | 12/2001 | Burke | |
| 2001/0051341 A1 | 12/2001 | Lo et al. | |
| 2002/0045196 A1 | 4/2002 | Mahoney et al. | |
| 2002/0066216 A1 | 6/2002 | DeLaCruz | |
| 2002/0086346 A1 | 7/2002 | Ryan | |
| 2002/0119503 A1 | 8/2002 | Ryan et al. | |
| 2003/0232377 A1 | 12/2003 | Thomas | |
| 2004/0014107 A1 | 1/2004 | Garcia-Blanco | |
| 2004/0038424 A1 | 2/2004 | Maples | |
| 2004/0137417 A1 | 7/2004 | Ryan | |
| 2005/0029559 A9 | 2/2005 | Ahn et al. | |
| 2005/0049793 A1 | 3/2005 | Paterlini-Brechot | |
| 2005/0232377 A1 | 3/2005 | Paterlini-Brechot | |
| 2005/0107316 A1 | 5/2005 | Strebhardt et al. | |
| 2005/0181353 A1 | 8/2005 | Rao et al. | |
| 2005/0181463 A1 | 8/2005 | Rao et al. | |
| 2005/0277204 A1 | 12/2005 | Hollis et al. | |
| 2006/0008807 A1 | 1/2006 | O'Hara | |
| 2006/0105372 A1 | 5/2006 | Bair et al. | |
| 2006/0194192 A1 | 8/2006 | Rao et al. | |
| 2006/0210429 A1 | 9/2006 | Hunsley et al. | |
| 2007/0111233 A1 | 5/2007 | Bianchi et al. | |
| 2007/0134658 A1 | 6/2007 | Bohmer | |
| 2007/0178478 A1 | 8/2007 | Dhallan | |
| 2007/0202525 A1 | 8/2007 | Quake et al. | |
| 2007/0243548 A1 | 10/2007 | Bischoff | |
| 2007/0243549 A1 | 10/2007 | Bischoff | |
| 2007/0251337 A1 | 11/2007 | Reed et al. | |
| 2007/0298406 A1 | 12/2007 | Martorell et al. | |

(56) References Cited

U.S. PATENT DOCUMENTS

| | | |
|---|---|---|
| 2008/0020390 A1 | 1/2008 | Mitchell et al. |
| 2008/0057502 A1 | 3/2008 | Kopreski |
| 2008/0081689 A1 | 4/2008 | Seelig et al. |
| 2008/0096217 A1 | 4/2008 | Kopreski |
| 2008/0102470 A1 | 5/2008 | Dawson |
| 2008/0108071 A1 | 5/2008 | Thompson |
| 2008/0119645 A1 | 5/2008 | Griffey et al. |
| 2008/0206866 A1 | 8/2008 | Zieglschmid et al. |
| 2008/0261292 A1 | 10/2008 | Kopreski |
| 2008/0318801 A1 | 12/2008 | Leung et al. |
| 2009/0034446 A1 | 2/2009 | Adams et al. |
| 2009/0081678 A1 | 3/2009 | Ryan et al. |
| 2009/0215036 A1 | 8/2009 | Stropp et al. |
| 2009/0308303 A1 | 12/2009 | Burlando |
| 2010/0167271 A1 | 7/2010 | Ryan |
| 2010/0184069 A1 | 7/2010 | Fernando et al. |
| 2010/0209930 A1 | 8/2010 | Fernando |
| 2010/0216153 A1 | 8/2010 | Lapidus et al. |
| 2010/0317107 A1 | 12/2010 | Ryan |
| 2011/0027771 A1 | 2/2011 | Deng |
| 2011/0053208 A1 | 3/2011 | Reiss |
| 2011/0111410 A1 | 5/2011 | Ryan et al. |
| 2012/0164676 A1 | 6/2012 | Tsinberg |
| 2012/0308990 A1 | 12/2012 | TerMaat |
| 2013/0034860 A1 | 2/2013 | Fernando |
| 2014/0054508 A1 | 2/2014 | Fernando |
| 2014/0080112 A1 | 3/2014 | Ryan et al. |
| 2014/0199681 A1 | 4/2014 | Ryan et al. |
| 2015/0301037 A1 | 10/2015 | Tsinberg et al. |
| 2016/0143268 A1 | 5/2016 | Ryan |
| 2016/0174544 A1 | 6/2016 | Fernando et al. |

FOREIGN PATENT DOCUMENTS

| | | |
|---|---|---|
| EP | 1031626 A1 | 8/2000 |
| EP | 1207208 A2 | 5/2002 |
| EP | 1217372 A1 | 6/2002 |
| EP | 1816461 A1 | 8/2007 |
| EP | 1889921 A2 | 2/2008 |
| EP | 1 425 294 B1 | 7/2008 |
| EP | 2228453 A1 | 9/2010 |
| EP | 2216416 | 11/2010 |
| EP | 2411808 B1 | 2/2012 |
| EP | 2674502 A1 | 12/2013 |
| EP | 1816461 B1 | 1/2020 |
| WO | 93/05650 | 4/1993 |
| WO | 94/02646 | 2/1994 |
| WO | 95/26417 A1 | 10/1995 |
| WO | 98/02528 A1 | 1/1998 |
| WO | 98/02740 A1 | 1/1998 |
| WO | 98/59042 A1 | 12/1998 |
| WO | 00/06780 A1 | 2/2000 |
| WO | 00/75647 A1 | 12/2000 |
| WO | 00/77235 | 12/2000 |
| WO | 01/79851 A1 | 10/2001 |
| WO | 01/98542 | 12/2001 |
| WO | 02/055985 | 7/2002 |
| WO | WO 03/018757 A2 | 3/2003 |
| WO | WO 03/019141 A2 | 3/2003 |
| WO | 03/018757 | 6/2003 |
| WO | 03/069344 | 8/2003 |
| WO | 03/095974 | 11/2003 |
| WO | 2006/100063 A2 | 9/2006 |
| WO | 2007/022483 A2 | 2/2007 |
| WO | 2008/107724 A2 | 9/2008 |
| WO | 2008/111981 A1 | 9/2008 |
| WO | 2010/096323 A1 | 8/2010 |
| WO | 2010/123908 A1 | 10/2010 |
| WO | 2011/014741 A1 | 2/2011 |
| WO | 2011/057184 | 5/2011 |
| WO | 2011/082415 A2 | 7/2011 |
| WO | 2012/145662 A1 | 10/2012 |
| WO | 2012/166913 A1 | 12/2012 |
| WO | 2013/086428 A1 | 6/2013 |
| WO | 2013/123030 A3 | 8/2013 |
| WO | 2014/029791 A1 | 2/2014 |

OTHER PUBLICATIONS

Katz DA et al. No date. "Mass-Volume Equivalents of Common Chemical Solids." Available online at <http://www.chymist.com/Mass-volume%20equivalents.pdf>. Accessed Oct. 22, 2015. 4 pages.*

Ames et al, 1975, An Appraisal of the "Vacutainer" System for Blood Collection, Ann. clin. Biochem, 12: 151-155 (Year: 1975).*

Canadian Office Action dated Oct. 1, 2010, received from the Canadian Intellectual Property Office.

Canadian Office Action dated Feb. 23, 2012, received from the Canadian Intellectual Property Office.

Decision to refuse a European Patent application dated May 30, 2007, received from the European Patent Office.

Clinical Applications of Flow Cytometry: Immunophenotyping of Leukemic Cells; Approved Guideline; Jun. 1998; vol. 18 No. 8; NCCLS.

Notice of Opposition to a European patent dated Apr. 24, 2009, received from the European Patent Office.

Biorecptor Ferrofluids: Novel Characteristics and their Utility in Medical Applications; P. A. Liberti, J. N. Chiarappa, A. C. Hovespian, C. G. Rao; Supplied by the British Library; 1996 Kluwer Academic Publishers.

American Association for Cancer Research; 93$^{rd}$ Annual Meeting; Apr. 6-10, 2002; San Francisco, California; vol. 43, Mar. 2002.

A Sample Preparation and Analysis System for Indentification of Circulating Tumor Cells; vol. 25, No. 1; Spring 2002; Journal of Clinical Ligand Assay.

European Office Action dated Feb. 22, 2016; Application No. 07008752.3.

European Office Action, Application No. 13706856.5 dated Mar. 10, 2016.

European Third Party Observations dated Aug. 30, 2016; Application No. 10704474.5.

WIEBE, Article in Life Sciences dated Feb. 1991, "Inhibition of Cell Proliferation by Glycerol".

European Third Party Observations dated May 25, 2016; Application No. 13706856.5.

Office Action dated Jun. 21, 2016; U.S. Appl. No. 15/010,549.

Ashoor, G et al., "Trisomy 13 detection in the first trimester of pregnancy using a chromosome-selective cell-free DNA analysis method" Ultrasound in Obstetrics & Gynecology; 41(1):21-5, Nov. 23, 2012.

Barrett et al., "Implementing Prenatal Diagnosis Based on Cell-Free Fetal DNA: Accurate Identification of Factors Affecting Fetal DNA Yield," PLoS One, 6(10):e25202, Oct. 4, 2011.

Bayindir, B et al., "Noninvasive Prenatal Testing Using a Novel Analysis Pipeline to Screen for All Autosomal Fetal Aneuploidies Improves Pregnancy Management," European Journal of Human Genetics. Jan. 14, 2015.

Beck, J et al., Digital Droplet PCR for Rapid Quantification of Donor DNA in the Circulation of Transplant Recipients as a Potential Universal Biomarker of Graft Injury. Clinical chemistry; 59(12):1732-41, Dec. 1, 2013.

Benachi, A et al., Cell-Free DNA Analysis in Maternal Plasma in Cases of Fetal Abnormalities Detected on Ultrasound Examination. Obstetrics & Gynecology; 125(6):1330-7, Jun. 1, 2015.

Bethel, K et al., "Fluid phase biopsy for detection and characterization of circulating endothelial cells in myocardial infarction," Physical biology; 11(1):016002, Feb. 1, 2014.

Bevilacqua, E et al., "Performance of screening for aneuploidies by cell-free DNA analysis of maternal blood in twin pregnancies," Ultrasound in Obstetrics & Gynecology; 45(1):61-6, Jan. 1, 2015.

Bianchi et al., "PCR Quantification of Fetal Cells in Maternal Blood in Normal and Aneuploid Pregnancies" Am J. Hum. Genet. 61:822-829, 1997.

Bianchi, "Invited Editorial Fetal DNA in Maternal Plasma: the Plot Thickens and the Placental Barrier Thins," The American Society of Human Genetics, 62:763-764, 1998.

(56) References Cited

OTHER PUBLICATIONS

Bianchi, D et al., "Fetal sex chromosome testing by maternal plasma DNA sequencing: clinical laboratory experience and biology," Obstetrics & Gynecology; 125(2):375-82, Feb. 1, 2015.
Bianchi, DW et al., "DNA sequencing versus standard prenatal aneuploidy screening" New England Journal of Medicine;370(9):799-808, Feb. 27, 2014.
Bina-Stein, et al., Aurintricarboxylic Acid Is a Nonspecific Enzyme Inhibitor, Department of Chemistry, Yale University, New Haven, Connecticut. 1975, 12:191-193.
Biocept—Expands Patent Protection for Liquid Biopsy Platform dated Jun. 1, 2015; http://ir.biocept.com/releasedetail.cfm?releaseID=915635.
Biocept (BIOC) Announces Patent for Blood Collection and Transport Tube; StreetInsider.com; http://www.streetinsider.com/corporate+news/biocept+(BIOC)+Announces; Jun. 1, 2015.
Biocept Completing the Answer; Jan. 21, 2015; http://ir.biocept.com/secfiling.cfm?filingid=1193125-15-16425&cik=1044378.
Botezatu et al. "Genetic Analysis of DNA Excreted in Urine: a New Approach for Detecting Specific Genomic DNA Sequences from Cells Dying in an Organism" Clinical Chemistry 46:8, 1078-1084 (2000).
Brar, H et al., "The fetal fraction of cell-free DNA in maternal plasma is not affected by a priori risk of fetal trisomy," The Journal of Maternal-Fetal & Neonatal Medicine; 26(2):143-5, Jan. 1, 2013.
Brown "Effect of Blood Collection and Processing on Radioimmunoassay Results for Apolipoprotein B in Plasma" Clinical Chemistry, 36/9, 1662-1666, 1990.
Bruno, D et al., Use of copy number deletion polymorphisms to assess DNA chimerism. Clinical chemistry; 60(8):1105-14, Aug. 1, 2014.
Butler "Genetics and Genomics of Core Short Tandem Repeat Loci Used in Human Identity Testing," Journal of Forensic Science, vol. 51, No. 2, pp. 253-265, Mar. 2006.
Buysse, K et al. "Reliable noninvasive prenatal testing by massively parallel sequencing of circulating cell-free DNA from maternal plasma processed up to 24h after venipuncture," Clinical biochemistry; 46(18):1783-6, Dec. 31, 2013.
Carlsson, A et al., "Circulating Tumor Microemboli Diagnostics for Patients with Non-Small-Cell Lung Cancer," Journal of Thoracic Oncology; 9(8):1111-9, Aug. 1, 2014.
Chan et al, "Hypermethylated RASSFIA in maternal Plasma: a Universal Fetal DNA Marker that Improves the Reliability of Noninvasive Prenatal Diagnosis," Clinical Chemistry, 2211-2218, 52(12), 2006.
Chinnapapagari et al., "Treatment of Maternal Blood Samples with Formaldehyde does not alter the Proportion of Circulatory Fetal Nucleic Acids (DNA and mRNA) in Maternal Plasma", Technical Briefs, University Women's Hospital/Dept. of Research, Basel, Switzerland, pp. 652-655, Apr. 2005.
Chiu, Rosa et al.,"Effects of Blood-Processing Protocols on Fetal and Total DNA Quantification in Maternal Plasma," Clinical Chemistry 47:9, 1607-1613, 2001.
Chudziak, J et al., "Clinical evaluation of a novel microfluidic device for epitope-independent enrichment of circulating tumour cells in patients with small cell lung cancer," The Analyst;141(2):669-78, Nov. 2015.
Chung et al., "Lack of Dramatic Enrichment of Fetal DNA in Maternal Plasma by Formaldehyde Treatment," Clinical Chemistry, 51, No. 3, 2005.
Chung et al.; "Detrimental Effect of Formaldehyde on Plasma RNA Detection" 51 (6): 10, Jul. 12, 2010.
Clark-Ganheart et al., "Use of Cell-Free DNA in the Investigation of Intrauterine Fetal Demise and Miscarriage," Obstetrics & Gynecology; 125(6):1321-9, Jun. 1, 2015.
Comas, C et al., "Initial Experience with Non-Invasive Prenatal Testing of Cell-Free DNA for Major Chromosomal Anomalies in a Clinical Setting," The Journal of Maternal-Fetal & Neonatal Medicine; (0):1-6, Aug. 12, 2014.
Costa et al. "Fetal Expressed Gene Analysis in maternal Blood: a New Tool for Noninvasive Study of the Fetus" Clinical Chemistry, vol. 49, No. 6, pp. 981-983, 2003.
Curnow et al., "Detection of Triploid, Molar, and Vanishing Twin Pregnancies by a Single-Nucleotide Polymorphism-Based Noninvasive Prenatal Test," American Journal of Obstetrics and Gynecology; 212(1):79-e1 Jan. 2015.
Dash et al. "Using Noninvasive Prenatal Testing for Aneuploidies in a Developing Country: Lessons Learnt" Journal of Fetal Medicine, 1(3):131-5, 2014.
Denis et al. "Efficient Detection of BRAF Mutation in Plasma of Patients after Long-term Storage of Blood in Cell-Free DNA Blood Collection Tubes" Clinical Chemistry, 61(6):886-8, Jun. 1, 2015.
Dhallan et al., "Methods to Increase the Percentage of Free Fetal DNA Recovered from the Maternal Circulation," JAMA vol. 291, No. 9, 1114-1119, Mar. 3, 2004.
Dharajiya et al. "Noninvasive Prenatal Testing Using Cell-Free Fetal DNA in Maternal Plasma" Current Protocols in Human Genetics, 8-15, Jan. 20, 2015.
Diamond et al. "Diverse and Targetable Kinase Alterations Drive Histiocytic Neoplasms" Cancer discovery: CD-15, Nov. 15, 2015.
Ding, et al., MS Analysis of Single-Nucleotide Differences in Circulating Nucleic Acids: Application to Noninvasive Prenatal Diagnosis, 101:10762-10767, 2004.
Fairbrother et al. "Clinical experience of noninvasive prenatal testing with cell-free DNA for fetal trisomies 21, 18, and 13, in a general screening population" Prenatal Diagnosis; 33(6):580-3, Jun. 1, 2013.
Fernando et al., "Stabilization of cell-free RNA in blood samples using a new collection device" Clinical Biochemistry, vol. 45, No. 16-17, pp. 1497-1502, dated Nov. 1, 2012.
Fernando et al., "Stabilization of Cell-Free RNA in Plasma for Noninvasive Diagnosis and Prognosis" URL:http://www.streck.com/resources/Cell_Stabilization/02_Paper_Cell-Free_RNA_BCT_Stabilization_of_Cell-Free_RNA_in_Plasma.pdf Retrieved on May 15, 2014.
Futch et al. "Initial clinical laboratory experience in noninvasive prenatal testing for fetal aneuploidy from maternal plasma DNA samples" Prenatal Diagnosis; 33(6):569-74, Jun. 1, 2013.
Gielis, E.M.,"Cell-Free DNA: an Upcoming Biomarker in Transplantation," American Journal of Transplantation May 13, 2015.
Gil, et al. "Implementation of maternal blood cell-free DNA testing in early screening for aneuploidies" Ultrasound in Obstetrics & Gynecology; 42(1):34-40, Jun. 7, 2013.
Gil et al. "UK NHS pilot study on cell-free DNA testing in screening for fetal trisomies: factors affecting uptake" Ultrasound in Obstetrics & Gynecology; 45(1):67-73. Jan. 1, 2015.
Gil et al."Cell-Free DNA Analysis for Trisomy Rosk Assessment in First-Trimester Twin Pregnancies" Fetal Diagnosis and Therapy, 35(3), pp. 204-211, Sep. 15, 2013.
Gonzalez, et al., "Application of Fetal DNA Detection in Maternal Plasma: a Prenatal Diagnosis Unit Experience," Journal of Histochemistry & Cytochemistry, 53(3): 307-314, 2005.
Grömminger et al. "Fetal aneuploidy detection by cell-free DNA sequencing for multiple pregnancies and quality issues with vanishing twins" Journal of Clinical Medicine; 3(3):679-92, Jun. 25, 2014.
Gross et al. "Rapid changes in circulating tumor cells following anti-angiogenic therapy" Convergent Science Physical Oncology; 1(1):015002, Sep. 15, 2015.
Haaland, Arne. Molecules and models: the molecular structures of main group element compounds. Oxford University Press, 2008. (abstract available at http://www.oxfordscholarship.com/view/10.1093/acprof:oso/9780199235353.001.0001/acprof-9780199235353-chapter-12).
Hidestrand et al. "Influence of temperature during transportation on cell-free DNA analysis" Fetal diagnosis and Therapy; 31(2):122-8, 2012.
Hindson et al. "High-throughput droplet digital PCR system for absolute quantitation of DNA copy number" Analytical Chemistry; 83(22):8604-10, Oct. 28, 2011.
Holford et al, Stability of beta-actin mRNA in plasma, Annals of the New York Academy of Science, Aug. 2008, 108-111, 1137.

(56) References Cited

OTHER PUBLICATIONS

Holmberg et al. "Akonni TruTip® and Qiagen® methods for extraction of fetal circulating DNA—evaluation by real-time and digital PCR" PloS One; 8(8):e73068, Aug. 2013.
Hooks et al. "Non-invasive risk assessment of fetal sex chromosome aneuploidy through directed analysis and incorporation of fetal fraction" Prenatal Diagnosis; 34(5):496-9, May 2014.
Hynek et al., "MoM-based Approach to Noninvasive Prenatal Testing Using Exponentially Weighted Moving Average Chart and Chromosomal Fingerprint" International Journal of Biomedicine and Healthcare: 12, 2015.
Ignatiadis et al. "Circulating Tumor Cells and Circulating Tumor DNA: Challenges and Opportunities on the Path to Clinical Utility" Clinical Cancer Research; 21 (21): 4786-800, Nov. 2015.
Jensen et al. "High-throughput massively parallel sequencing for fetal aneuploidy detection from maternal plasma" PloS One; 8(3): e57381, Mar. 2013.
Jeon et al. "The feasibility study of non-invasive fetal trisomy 18 and 21 detection with semiconductor sequencing platform" PLoS One; 9(10):e110240, Oct. 20, 2014.
Juneau et al. "Microarray-based cell-free DNA analysis improves noninvasive prenatal testing" Fetal Diagnosis and Therapy; 36(4):282-6, 2014.
Kadam et al. "Quantitative measurement of cell-free plasma DNA and applications for detecting tumor genetic variation and promoter methylation in a clinical setting" The Journal of Molecular Diagnostics. Jul. 31, 2012;14(4):346-56.
Kashiwasaki et al. "Influence of upper and lower thermoneitral room temperatures (20° C. and 25° C.) on fasting and post-prandial resting metabolism under different outdoor temperatures," European Journal of Clinical Nutrition, vol. 44, pp. 405-413, 1990.
Katz et al. No Date. "Mass-Volume Equivalents of Common Chemical Solids." Available at <http://www.chymist.com/Mass-volume%20equivalents.pdf>. Accessed Oct. 22, 2015. 4 pages.
Kelly, Brian N., "Circulating microRNA as a biomarker of human growth hormone administration to patients," Mar. 12, 2013, vol. 6, Issue 3.
Kidess et al. "Mutation profiling of tumor DNA from plasma and tumor tissue of colorectal cancer patients with a novel, high-sensitivity multiplexed mutation detection platform" Oncotarget. Feb. 2015; 6(4):2549.
Kirkizlar et al. "Detection of Clonal and Subclonal Copy-Number Variants in Cell-Free DNA from Patients with Breast Cancer Using a Massively Multiplexed PCR Methodology" Translational oncology. Oct. 31, 2015;8(5):407-16.
Kreuzer et al. "Highly Sensitive and specific Fluorescence Reverse Transcription-PCR Assay for the Psuedogene-free Detection of β-actin Transcripts as Quantitative Reference" Clinical Chemistry, vol. 45, No. 2, pp. 297-300, 1999.
Kwee et al. "Measurement of Circulating Cell-Free DNA in Relation to 18F-Fluorocholine PET/CT Imaging in Chemotherapy-Treated Advanced Prostate Cancer" Clinical and Translational Science. Feb. 1, 2012;5(1):65-70.
Lambert-Messerlian et al. "Feasibility of using plasma rather than serum in first and second trimester multiple marker Down's syndrome screening. Journal of medical screening" Dec. 1, 2012;19(4):164-70.
Lanman et al . . . "Analytical and clinical validation of a digital sequencing panel for quantitative, highly accurate evaluation of cell-free circulating tumor DNA" PloS one. Oct. 16, 2015;10(10):e0140712.
Lee et al. "Performance of Momguard, a new non-invasive prenatal testing protocol developed in Korea" Obstetrics & Gynecology Science. Sep. 1, 2015;58(5):340-5.
Lee et al., "Survival of Donor Leukocyte Subpopulations in Immunocompetent Transfusion Recipients: Frequent Long-Term Microchimerism in Severe Trauma Patients," Blood, 3127-3139, 93, 1999.
Lee, Thomas "Down Syndrome and Cell-Free Fetal DNA in Archived Maternal Serum" (AM J. Obstet Gynecol 2002; 187: 1217-21).

Li, et al., "Detection of Paternally Inherited Fetal Point Mutations for ß-Thalassemia Using Size-Fractionated Cell-Free DNA in Maternal Plasma," available at: www.jama.com, 293:843-849, 2005.
Liao et al. "Noninvasive prenatal diagnosis of common aneuploidies by semiconductor sequencing" Proceedings of the National Academy of Sciences. May 20, 2014; 111(20):7415-20.
Liu et al. "Placental mosaicism for Trisomy 13: a challenge in providing the cell-free fetal DNA testing" Journal of assisted reproduction and genetics. May 1, 2014;31(5):589-94.
Lo et al. "Fetal Cell-Free Plasma DNA Concentrations in Maternal Blood are Stable 24 hours after" Clinical-Chemistry (Jan. 19, 2012).
Lo et al. "Presence of Fetal DNA in Maternal Plasma and Serum" The Lancet, 350, 485-87, 1997.
Lo et al., "Noninvasive prenatal diagnosis for fetal chromosomal aneuploidies by maternal plasma nucleic acid analysis" Clinical Chemistry, American Association for Clinical Chemistry, Washington DC Lnkd-Doi:10.1373/Clinchem.2007.100016, vol. 54, No. 3, pp. 461-466, Jan. 17, 2008.
Lo, "Fetal DNA in Maternal Plasma: Biology and Diagnostic Applications," Clinical Chemistry 46:12 1903-1906, 2000.
Lo, et al., "Increased Fetal DNA Concentrations in the Plasma of Pregnant Women Carrying Fetuses with Trisomy 21" Clinical Chemistry 45:10, 1747-1751 (1999).
Lo, et al., "Quantitative Analysis of Fetal DNA in Maternal Plasma and Serum: Implications for Noninvasive Prenatal Diagnosis," by The American Society of Human Genetics, 62:768-775, 1998.
Lo, Y M Dennis "Circulating Nucleic Acids in Plasma and Serum: an Overview", Annals of the New York Academy of Sciences vol. 945, Issue pp. 1-291 (Sep. 2001).
Lo, Y M Dennis "Molecular Testing of Urine: Catching DNA on the way out" Clinical Chemistry 46, No. 8, 2000.
Lo, Y M Dennis, "Fetal Nucleic Acids in Maternal Plasma, Toward the Development of Noninvasive Prenatal Diagnosis of Fetal Chromosomal Aneuploidies," New York Academy of Sciences, 2008.
Lu et al. Detection and Characterization of Circulating Tumour Cells from Frozen Peripheral Blood Mononuclear Cells. Journal of Circulating Biomarkers. Dec. 1, 2015;35(12):1243-6.
Machaca et al., "Characterization of apoptosis-like endonuclease activity in avian thymocytes," Biology of the Cell, 15-22, 76(1), Elsevier, Paris France, Jan. 1, 1992.
Madabusi et al., "RNA extraction for Arrays," Methods in Enzymology, 1-14, 411, 2006.
May et al. "How Many Species Are There on Earth?," Science vol. 241 p. 1441-1449, 1988.
McCullough et al. "Non-invasive prenatal chromosomal aneuploidy testing-clinical experience: 100,000 clinical samples" PLoS One. Oct. 7, 2014;9(10):e109173.
Miller "A Simple Salting Out Procedure for Extracting DNA from Human Nucleated Cells," Nucleic Acids Research vol. 16, p. 1215 (1988).
Modrek "Genome-wide Detection of Alternative Splicing in Expressed Sequences of Human Genes," Nucleic Acid Research, vol. 29, No. 13 pp. 2850-2859, (2001).
Nair et al. "An observational study of circulating tumor cells and (18) F-FDG PET uptake in patients with treatment-naive non-small cell lung cancer" PloS One. Jul. 5, 2013;8(7):e67733.
Nicolaides et al. "Validation of targeted sequencing of single-nucleotide polymorphisms for non-invasive prenatal detection of aneuploidy of chromosomes 13, 18, 21, X, and Y" Prenatal Diagnosis, Jun. 1, 2013;33(6):575-9.
Norton et al. "Cell-free DNA analysis for noninvasive examination of trisomy" New England Journal of Medicine. Apr. 23, 2015;372(17):1589-97.
Norton et al. "Non-Invasive Chromosomal Evaluation (NICE) Study: results of a multicenter prospective cohort study for detection of fetal trisomy 21 and trisomy 18" American Journal of Obstetrics and Gynecology. Aug. 31, 2012;207(2):137-e1.
Ono et al. "Circulating microRNA Biomarkers as Liquid Biopsy for Cancer Patients: Pros and Cons of Current Assays" Journal of clinical medicine. Oct. 23, 2015;4(10):1890-907.
Palmer et al., "Flow cytometric determination of residual white blood cell levels in preserved samples from leukoreduced blood products," Transfusion, 118-128, 48(1), Jan. 2008.

(56) References Cited

OTHER PUBLICATIONS

Pan, et al., "Cell-free Fetal DNA Levels in Pregnancies Conceived by IVF", Human Reproduction, 20(11):3152-3156, 2005.
Persico et al. "Cell-free DNA testing in the maternal blood in high-risk pregnancies after first trimester combined screening" Prenatal Diagnosis. Jan. 1, 2016.
Pertl, et al., "Fetal DNA in Maternal Plasma: Emerging Clinical Applications," by The American College of Obstetricians and Gynecologists, 98:483-490, 2001.
Pinzani et al., "Circulating Nucleic Acids in Cancer and Pregnancy," Methods: a Companion to Methods in Enzymology, 302-307, 40 (4), Academic Press Inc., New York, Apr. 1, 2010.
Punnoose et al. "PTEN loss in circulating tumour cells correlates with PTEN loss in fresh tumour tissue from castration-resistant prostate cancer patients" British Journal of Cancer. Oct. 20, 2015;113(8):1225-33.
Puren et al., Laboratory operations, specimen processing, and handling for viral load testing and surveillance, Journal of Infectious Diseases, S27-S36, 201(supp 1), University of Chicago Press, Chicago Il, Apr. 15, 2010.
Quezada et al. "Fetal fraction of cell-free DNA in maternal plasma in the prediction of spontaneous preterm delivery," Ultrasound in Obstetrics & Gynecology. Jan. 1, 2015;45(1):101-5.
Quezada et al. "Screening for trisomies 21, 18 and 13 by cell-free DNA analysis of maternal blood at 10-11 weeks' gestation and the combined test at 11-13 weeks" Ultrasound in Obstetrics & Gynecology. Jan. 1, 2015;45(1):36-41.
Rait et al. "Conversions of formaldehyde-modified 2'-deoxyadenosine 5'-monophosphate in conditions modeling formalin-fixed tissue dehydration" J. Histochem Cytochem 54(3): 301-10 (Mar. 1, 2006).
Risberg B. "Establishment of PCR based methods for detection of ctDNA in blood." Thesis submitted for the Master's degree in Biomedicine. Oslo University Hospital, Institute for Cancer Research, Department of Genetics and Oslo and Akershus University College of Applied Sciences. May 5, 2013.
Ruiz et al. "Limited genomic heterogeneity of circulating melanoma cells in advanced stage patients" Physical Biology. Feb. 1, 2015;12(1):016008.
Rykova et al., "Concentrations of Circulating RNA from Healthy Donors and Cancer Patients Estimated by Different Method," Ann. N.Y. Acad. Sci. (2006) vol. 1075, pp. 328-333.
Salvianti et al. "Single circulating tumor cell sequencing as an advanced tool in cancer management" Expert review of molecular diagnostics. Nov. 27, 2015:1-3.
Samango-Sprouse et al. "SNP-based non-invasive prenatal testing detects sex chromosome aneuploidies with high accuracy" Prenatal diagnosis. Jul. 1, 2013;33(7):643-9.
Samoila et al. "Method development and validation for clinical cfDNA extraction from blood" InASCO Annual Meeting Proceedings May 20, 2015 (vol. 33, No. 15_suppl, p. e22185).
Samuel et al. "The effect of chorionic villus sampling on the fraction of cell-free fetal DNA in maternal plasma" The Journal of Maternal-Fetal & Neonatal Medicine. Oct. 15, 2015:1-4.
Schatz et al.; "Preservation of Cell-Free DNA in Stored Blood Samples for the Analysis of the (M) Sept9 Colorectal Cancer Screening Marker Enables Sample Shipment by Mail", May 2011, Published as a poser at the conference on International federation of clinical chemistry and laboratory medicine Worldlab and EU, Berlin, Germany.
Scheffer et al. "Noninvasive fetal blood group genotyping of rhesus D, c, E and of K in alloimmunised pregnant women: evaluation of a 7-year clinical experience" BJOG: an International Journal of Obstetrics & Gynaecology. Oct. 1, 2011;118(11):1340-8.
Schiavon et al. "Analysis of ESR1 mutation in circulating tumor DNA demonstrates evolution during therapy for metastatic breast cancer" Science translational medicine. Nov. 11, 2015;7(313):313ra182-.
Sekizawa et al.; "Apoptosis in Fetal Nucleated Erythrocytes Circulating in Maternal Blood" Prenatal Diagnosis; 20: 886-889, 2000.
Seo et al. "An Experience of Using the Harmony Test for Genomics-Based Non-Invasive Prenatal Testing" Journal of Laboratory Medicine and Quality Assurance. Mar. 1, 2015;37(1):44-6.
Shi et al. "Feasibility of noninvasive prenatal testing for common fetal aneuploidies in an early gestational window" Clinica Chimica Acta. Jan. 15, 2015;439:24-8.
Sigma-Aldrich. "1-Aza-3,7-dioxabicyclo[3.3.0]octane-5-methanol solution." Available online at www.sigmaaldrich.com/catalog/product/aldrich/417807?lang=en&region=US. 5 pages. Accessed Jan. 13, 2014.
Sillence et al. "Fetal Sex and RHD Genotyping with Digital PCR Demonstrates Greater Sensitivity than Real-time PCR" Clinical Chemistry. Nov. 1, 2015;61(11):1399-407.
Skidmore et al., "Characterization and Use of the Potent Ribonuclease Inhibitor Aurintricarboxylic Acid for the Isolation of RNA from Animal Tissues," Biochem Journal, 263, pp. 73-80 (1989).
Slocum et al., "Electron-Microscopic Cytochemical Localization of Diamine and polyamine oxidases in Pea and Maize Tissues," Planta vol. 183, pp. 443-450, (1991).
Smid et al., "Evaluation of Different Approaches for Fetal DNA Analysis from Maternal Plasma and Nucleated Blood Cells", Technical Briefs, pp. 1570-1572, 1999.
Smid et al., "Quantitative Analysis of Fetal DNA in Maternal Plasma in Pathological Conditions Associated with Placental Abnormalities," Annals New York Academy of Sciences, 951:133-137, 2001.
Song et al. "Non-invasive prenatal testing for fetal aneuploidies in the first trimester of pregnancy" Ultrasound in Obstetrics & Gynecology. Jan. 1, 2015;45(1):55-60.
Sparks et al. "Noninvasive prenatal detection and selective analysis of cell-free DNA obtained from maternal blood: evaluation for trisomy 21 and trisomy 18" American Journal of Obstetrics and Gynecology. Apr. 30, 2012;206(4):319-e1.
Sparks et al. "Selective analysis of cell-free DNA in maternal blood for evaluation of fetal trisomy" Prenatal Diagnosis. Jan. 1, 2012;32(1):3-9.
Stokowski et al. "Clinical performance of non-invasive prenatal testing (NIPT) using targeted cell-free DNA analysis in maternal plasma with microarrays or next generation sequencing (NGS) is consistent across multiple controlled clinical studies" Prenatal Diagnosis. Dec. 1, 2015;35(12):1243-6.
Stumm et al. "Diagnostic accuracy of random massively parallel sequencing for non-invasive prenatal detection of common autosomal aneuploidies: a collaborative study in Europe" Prenatal Diagnosis. Feb. 1, 2014;34(2):185-91.
Takabayashi et al., "Development of Non-invasive Fetal DNA Diagnosis from Maternal Blood," Prenatal Diagnosis, 15:74-77, 1995.
The Scientific Committee on Cosmetic Product and Non-Food Products intended for Consumers "Opinion Concerning the Determination of Certain Formaldehyde Releasers in Cosmetic Products" Dec. 22, 2002, pp. 1-9.
Thung et al. "Implementation of whole genome massively parallel sequencing for noninvasive prenatal testing in laboratories" Expert Review of Molecular Diagnostics. Jan. 2, 2015;15(1):111-24.
Toro et al. "Comparison of cell stabilizing blood collection tubes for circulating plasma tumor DNA" Clinical Biochemistry. Oct. 31, 2015;48(15):993-8.
Toro. "Detection of PIK3CA Mutations in Plasma Tumor DNA Circulating in Peripheral Blood of Breast Cancer Patients" Thesis submitted for the degree of Master of Science in Molecular and Cellular Biology. Johns Hopkins University, Baltimore, Maryland. Apr. 2014.
Tynan et al. Application of risk score analysis to low-coverage whole genome sequencing data for the noninvasive detection of trisomy 21, trisomy 18, and trisomy 13. Prenatal diagnosis. Jan. 1, 2015.
US Food and Drug Adminstration, "Draft Guidance for Industry: Pre-Storage Leukocyte Reduction of Whole Blood and Blood Components Intended for Transfusion, Vaccines." Blood & Biologics, available at: www.fda.gov/biologicsbloodvaccines/guidance compliance regulatoryinformation/guidances/blood/ucm076769.htm, last accessed Apr. 13, 2011.

(56) References Cited

OTHER PUBLICATIONS

Vandenberghe et al. "Non-invasive detection of genomic imbalances in Hodgkin/Reed-Sternberg cells in early and advanced stage Hodgkin's lymphoma by sequencing of circulating cell-free DNA: a technical proof-of-principle study" The Lancet Haematology. Feb. 28, 2015;2(2):e55-65.
Verweij et al. "European Non-Invasive Trisomy Evaluation (EU-NITE) study: a multicenter prospective cohort study for non-invasive fetal trisomy 21 testing" Prenatal Diagnosis. Oct. 1, 2013;33(10):996-1001.
Wagner "Free DNA—new potential analyte in clinical laboratory diagnostics" Biochem Med (Zagreb) 22(1): 24-38 (2012).
Wang D et al. Exploring Glycan Markers for Immunotyping and Precision-targeting of Breast Circulating Tumor Cells. Archives of medical research. Dec. 1, 2015.
Wang E et al. "Gestational age and maternal weight effects on fetal cell-free DNA in maternal plasma" Prenatal diagnosis. Jul. 1, 2013;33(7):662-6.
Wang P et al. "Sensitive detection of mono-and polyclonal ESR1 mutations in primary tumors, metastatic lesions and cell free DNA of breast cancer patients" Clinical Cancer Research. Oct. 23, 2015:clincanres-1534.
Wang Q et al. "Real-time PCR evaluation of cell-free DNA subjected to various storage and shipping conditions" Genetics and Molecular Research. Jan. 1, 2015;14(4):12797-804.
Wang Y et al. "Maternal mosaicism is a significant contributor to discordant sex chromosomal aneuploidies associated with noninvasive prenatal testing" Clinical chemistry. Jan. 1, 2014;60(1):251-9.
Werner et al. "Analytical Validation and Capabilities of the Epic CTC Platform: Enrichment-Free Circulating Tumour Cell Detection and Characterization" Journal of Circulating Biomarkers. 2015 4:3.
Wienzek-Lischka et al. "Noninvasive fetal genotyping of human platelet antigen-1a using targeted massively parallel sequencing" Transfusion Apr. 1, 2015.
Willems et al. "The first 3,000 non-invasive prenatal tests (NIPT) with the harmony test in Belgium and the Netherlands" Facts, Views & Vision in ObGyn. 2014;6(1):7.
Wong et al. "Optimizing blood collection, transport and storage conditions for cell free DNA increases access to prenatal testing" Clinical Biochemistry. Aug. 31, 2013;46(12):1099-104.
Woolcock et al. "Noninvasive prenatal testing." Australian Family Physician. Jul. 1, 2014;43(7):432.
Zhang, Yi et al., "Effect of Formaldehyde Treatment on the recovery of cell-free fetal DNA from Maternal Plasma at Different Processing Times" Clinic Chimica Acta 397, 60-64, 2008.
Zill et al. "Cell-free DNA next-generation sequencing in pancreatobiliary carcinomas" Cancer Discovery. Oct. 1, 2015;5(10):1040-8.
Co-pending U.S. Appl. No. 12/689,370, filed Jan. 19, 2010, Published as 2010/0184069 A1 on Jul. 22, 2010.
Co-pending U.S. Appl. No. 12/704,030, filed Feb. 11, 2010, Published as 2010/0209930 on Aug. 19, 2010.
Co-pending U.S. Appl. No. 12/850,269, filed Aug. 4, 2010, published on Dec. 16, 2010 as 2010/0317107.
Co-pending U.S. Appl. No. 12/941,437, filed Nov. 8, 2010, Published as 2011/0111410 on May 12, 2011.
Co-pending U.S. Appl. No. 13/648,415, filed Oct. 10, 2012, granted on Nov. 19, 2013 now U.S. Pat. No. 8,586,306.
Co-pending U.S. Appl. No. 13/766,207, filed Feb. 13, 2013, published on Mar. 20, 2014 as 2014/0080112.
Co-pending U.S. Appl. No. 14/071,969, filed Nov. 5, 2013, published on Feb. 18, 2014 as 2014/0054508.
Co-pending U.S. Appl. No. 14/153,204, filed Jan. 13, 2014, published on Jul. 7, 2014 as 2014/0199681.
Co-pending U.S. Appl. No. 14/907,167, filed Jan. 22, 2016, published on Jun. 23, 2016 as 2016/0174544.
Co-pending U.S. Appl. No. 15/010,549, filed Jan. 29, 2016, published on May 26, 2016 as 2016/0143268.
Passage from confidential document, Streck, Inc. Cell-Free DNA BCT 510(k) Premarket Notification, Sep. 19, 2012.
Antje Milde et al.: "Improved DNA typing of human urine by adding EDTA", Int. J Legal Med, Jan. 1, 1999, pp. 209-210, XP055291033.
Cannas A, Kalunga G, Green C, Calvo L, Katemangwe P, Reither K, Perkins MD, Maboko L, Hoelscher M, Talbot EA, Mwaba P. Implications of storing urinary DNA from different populations for molecular analyses. PloS one. Sep. 10, 2009;4(9):e6985.
Cherepanova A, Tamkovich S, Pyshnyi D, Kharkova M, Vlassov V, Laktionov P. Immunochemical assay for deoxyribonuclease activity in body fluids. Journal of immunological methods. Aug. 31, 2007;325(1):96-103.
Latifa El Bali et al.: "Comparative Study of Seven Commercial Kits for Human DNA Extraction from Urine Samples Suitable for DNA Biomarker-Based Public Health Studies", Journal of Biomolecular Techniques, Dec. 1, 2014.
Nicole T Vu et al.: "Genotyping for DQA1 and PM loci in urine using PCR-based amplification: Effects of sample volume, storage temperature, preservatives, and aging on DNA extraction and typing", Forensic Science International., vol. 102, No. 1, May 1, 1999, pp. 23-34.
S.H. Zhang et al.: "Genotyping of urinary samples stored with EDTA for forensic applications", Genetics and Molecular Research, vol. 11, No. 3, May 10, 2012, pp. 3007-3012, XP055291026, DOI: 10.4238/2012.
Su YH, Wang M, Aiamkitsumrit B, Brenner DE, Block TM. Detection of a K-ras mutation in urine of patients with colorectal cancer. Cancer Biomarkers. Jan. 1, 2005;1(2, 3):177-82; abstract only.
Tong YK, Lo YD. Diagnostic developments involving cell-free (circulating) nucleic acids. Clinica Chimica Acta. Jan. 31, 2006;363(1):187-96.
Dean, (proceeding national Academy of Sciences (2002) vol. 99, pp. 5261-5266).
Canadian Office Action dated Oct. 13, 2016; Application No. 2,780,536.
Extended European Search Report dated Oct. 21, 2016; Application No. 15196213.1.
PubChem, U.S. National Library of Medicine National Center for Biotechnology Information, Urea, https://pubchem.ncbi.nlm.nih.gov/compound/Urea (Year: 2019).
Chemical Book, CAS DataBase List, Diazolidinyl Urea, https://www.chemicalbook.com/ChemicalProductProperty_EN_CB2158514.htm (Year: 2019).
Hallick et al.; Use of Aurintricarboxylic Acid as in Inhibitor of Nucleases During Nucleic Acid Isolation; Nucleic Acid Research, (1977) vol. 4, pp. 3055-3064.
Smit et a; Semiautomated DNA Mutation Analysis Using a Robotic Workstation and Molecular Beacons; Clinical Chemistry, 2001, vol. 47, pp. 739-744.
What are the regulatory Definitions for "Ambient", "Room Temperature" and "Cold Chain" (http://www.gmp-compliance.org/gmp-news/what-are-the-regulatory-definitions-for-ambient-room-temperature-and-cold-chain) Feb. 3, 2017.
Wang and Enkel; Lipoprotient Lipase: from gene to obesity; Am J Physiol Endocrinol Met, 2009, vol. 297, pp. E271-E288.
Canadian Office Action, CA Application No. 2,938,275 dated May 13, 2019.
European Office Action, EP Application No. 13166264.5 dated Jan. 9, 2019.
Swamp et al; Circulating (cell-free) Nucleic Acids—a Promising, Non-Invasive Tool for Early Detection of Several Human Diseases; 2007; FEBS Letters 581, pp. 795-799.

* cited by examiner

METHOD AND DEVICE FOR COLLECTING AND PRESERVING CELLS FOR ANALYSIS

BACKGROUND

In biological and biochemical analysis, and related arts, it is often necessary to collect and preserve biological tissues (i.e., cells and cellular components), for useful periods of time. The collected and preserved cells are often utilized in a wide variety of applications, including but not limited to instructional aids and the diagnosis and treatment of diseases. For example, such cells are often utilized in histological, cytological, immunological, and proteinaceous studies and the like.

Various methods are known in the art for analyzing histological, cytological, immunological, and proteinaceous materials. For example, surface marker analysis has developed as a laboratory tool, which is particularly useful for clinical diagnosis through the investigation of immunostates, differentiation of cell types and development stages, and other cell processes. The expansion of uses for surface marker analysis has resulted in the use of flow cytometry and antibody probes to evaluate cellular properties. While other means of assaying for surface marker analysis exist, flow cytometry provides rapid, objective and quantitative assessment of surface markers. Furthermore, even though the microscope is still the conventional means for examining preserved and stained biological materials, biological materials may also be examined with a flow cytometer. The flow cytometer is an important method for examining a plurality of cells in a brief time.

Flow cytometry and flow cytometers are generally described in Keran's text, Flow cytometry in Clinical Diagnosis (1989). Flow cytometers operate in principle by multiparameter analysis of heterogeneous cell populations (or cellular components) on a cell-by-cell basis. Flow cytometry allows biological and physical properties of cells and cellular components to be determined. In flow cytometry, cells in suspension are forced single file, via hydrodynamic focusing, through the path of a laser beam. Interaction of the cells with the laser beam scatters some of the light and causes excitation and emission from fluorescent molecules present on the surface or interior of the cell. A series of lenses collect the scattered or emitted light and pass it to a photomultiplier. Each photomultiplier measures a separate parameter. Parameters measured include: forward light scatter, which measures relative particle size; side light scatter, which measures relative granularity or other internal structure; and fluorescence emission. The optical signals are converted by a computer to a data display for analysis and interpretation. Cells collected and preserved using conventional methods and instruments generally require further dilution and/or treatment before they can be analyzed by flow cytometry. Thus, it is desirable in the art to obtain a method and a collection device that allow the cells to be directly analyzed by flow cytometry without further dilution and/or treatment. (There is need for a method to collect and transport human blood specimens for flow cytometric analysis. Current methods are inadequate in that the samples have to be analyzed soon after collection.)

The primary objective of tissue preservation is to provide as much structural detail of cells and components thereof as possible. To do this, it is necessary to maintain the cells in their original unaltered morphology so that maximum cellular detail may be observed. With the clinical application of immunostaining, there is also the requirement that antigens are not altered by the method of preservation. Thus, it is desirable in the art to obtain a method and a collection device that maintain the cells in their original unaltered morphology and preserve their antigenic sites.

The usual formulations for preservation of cells contain one or more agents, which react vigorously with the proteins of the cells to denature and insolubilize the components of the cell. Typical of this type of agent is picric acid, mercuric ions, formaldehyde and glutaraldehyde. In addition, some less toxic compounds can also be utilized which denature and stabilize the proteins such as acetic and formic acid. Unfortunately, the toxicity associated with such compounds renders their use less than satisfactory. For example, a 37% solution of formaldehyde, the most common of these fixatives, is a noxious gas which is also toxic, flammable, and carcinogenic. Although efforts are made when this chemical is used to protect workers and avoid contamination of the drainage system when disposed, these efforts are usually both expensive and inconvenient, and fixatives such as formaldehyde still present a danger to laboratory workers and health care professionals. Thus, it is highly desirable to develop a method and a collection device, which can preserve the cells in a low toxicity and non-flammable environment so that it can be used safely, effectively and conveniently in histological and other studies.

For even easier handling, it is also desirable to develop a method and a collection device that allow transportation (e.g., from the collection site to the analysis site) of the cells in ambient temperature.

SUMMARY

The claimed subject matter addresses many of the challenges encountered when using conventional methods and instruments to collect and preserve cells by providing a method and a collection device that are capable of maintaining the cells in their original unaltered morphology; preserving the cell antigenic sites; and allowing the cells to be transported at ambient temperature, to be handled in a low toxicity and non-flammable environment, and to be directly analyzed by flow cytometry without further dilution and/or treatment. The claimed subject matter more specifically relates to a method and a device that allow cells (e.g., whole blood, epithelial cells, spinal fluid, and the like.) to be collected and preserved for analysis and addresses many of the challenges encountered when using conventional methods and instruments. Specifically, the claimed subject matter describes a method and a collection device that (1) use a less toxic and non-flammable reagent for fixing and stabilizing cells; (2) allow the cells to stay in their original unaltered morphology; (3) allow the cell antigenic sites to be preserved for a useful period of time; (4) allow the cells to be transported at ambient temperature; and/or (5) allow the cells to be directly analyzed by flow cytometry without further dilution and/or treatment.

The claimed subject matter includes a device to collect and preserve cells comprising of: (1) a collection container comprised of a tube having an open end and a closed end, a closure in the open end of the tube, a vacuum drawn to a predetermined level inside the container; and (2) compounds including an anticoagulant agent and a fixative agent selected from the group consisting of: diazolidinyl urea, imidazolidinyl urea, dimethoylol-5,5dimethylhydantoin, dimethylol urea, 2-bromo-2.-nitropropane-1,3-diol, oxazolidines, sodium hydroxymethyl glycinate, 5-hydroxymethoxymethyl-1-1aza-3, 7-dioxabicyclo [3.3.0]octane, 5-hydroxymethyl-1-1aza-3,7dioxabicyclo [3.3.0] octane, 5-hydroxypoly[methyleneoxy]methyl-1-1aza-3, 7dioxabicyclo [3.3.0]octane, quaternary adamantine and combinations thereof. The claimed subject matter may optionally include polyacrylic acid or a suitable acid having a pH ranging from about one to about seven inside the tube. The compounds of the device must be in a sufficient amount to preserve the collected cells' original morphology and antigenic sites without significant dilution of the cells (i.e., in a volume that is not clinically significant), and thereby allowing the cells, stored with the compounds, to be directly analyzed by a flow cytometer.

The claimed subject matter also includes a method comprised of (1) providing a tube with an open end and a closed end, (2) preloading the tube with compounds including: an anticoagulant agent, a fixative agent selected from the group consisting of: diazolidinyl urea, imidazolidinyl urea, dimethoylol-5, 5-dimethylhydantoin, dimethylol urea, 2-bromo-2-nitropropane-1,3-diol, oxazolidines, sodium hydroxymethyl glycinate, 5-hydroxymethoxymethyl-1-1aza-3, 7-dioxabicyclo[3.3.0]octane, 5-hydroxymethyl-1-1aza-3,7-dioxabicyclo[3.3.0]octane, 5-hydroxypoly[methyleneoxy] methyl-1-1aza-3,7dioxabicyclo[3.3.0]octane, and quaternary adamantine, and optionally a polyacrylic acid or a suitable acid having a pH ranging from about one to about seven, wherein the compounds are in a sufficient amount to preserve the collected cells' original morphology and antigenic sites without significant dilution of the cells, and thereby allowing the cells, stored with the compounds, to be directly analyzed by a flow cytometer; inserting a closure into the open end of the tube; and drawing a vacuum to a predetermined level inside the tube.

The method and device of the claimed subject matter may also optionally include other art-disclosed components conventionally used in cell collection and analysis such as gauze, glove, tourniquet, lancet, needle, test strip (e.g., immunoassay), alcohol swab, tube holder, additional cell collection tubes (with or without conventional cell analysis additives inside these tubes), adhesive strip, syringe, glass or plastic strip, packaging means to store the desired components and the device, and packaging means to transport at least the collected and preserved cells stored in the device. The method of the claimed subject matter may also optionally include additional art disclosed methods and instruments used for cell analysis such as a flow cytometer, a hematology analyzer, and other hematology instruments, etc.

DETAILED DESCRIPTION

The claimed subject matter can be satisfied by embodiments in many different forms, the drawings and the description herein describe in detail a preferred embodiment of the claimed subject matter. It is understood that the present disclosure is to be considered exemplary of the principles of the claimed subject matter and is not intended to limit the claimed subject matter to the embodiment illustrated. The scope of the claimed subject matter is measured by the appended claims and their equivalents.

Figure 1:
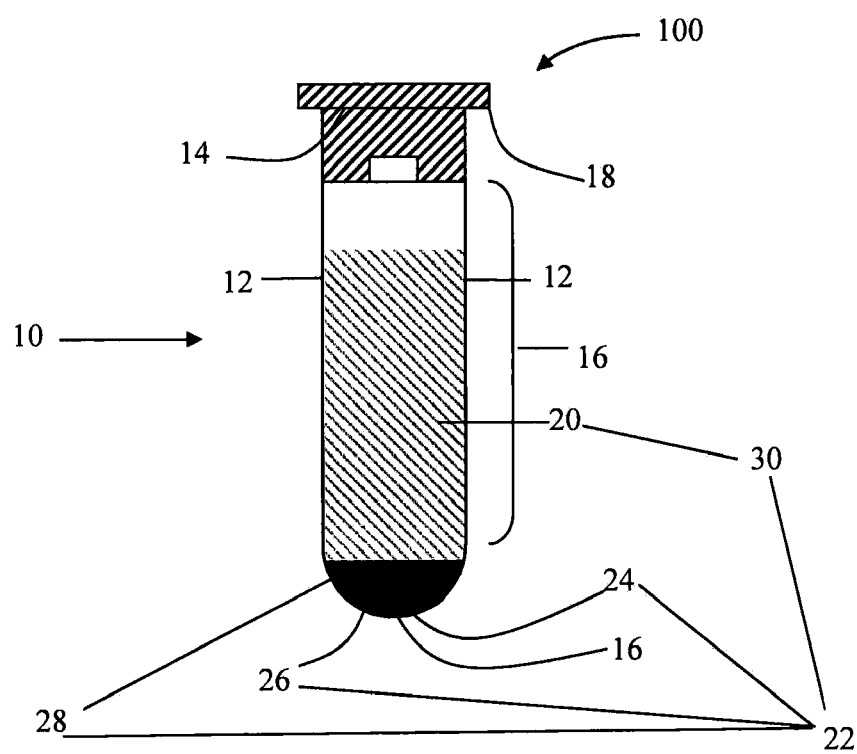
FIG. 1 A cross-sectional illustration of an exemplary embodiment of the collection device of the claimed subject matter.

Turning now to the drawings, FIG. 1 shows a cross-sectional illustration of a device 100 that incorporates a preferred embodiment of this claimed subject matter and can be used to collect and preserve biological tissues such as cells and cellular components for analysis. The device 100 is particularly useful in the collection of whole blood, but can be use to collect other types of bodily fluids and/or biological tissues (e.g., epithelial cells, bone marrow, spinal fluid and the like) including, without limitation, abnormal tissue samples such as leukemias, cancer tissue cancer, and the like as long as the tissue samples can be transformed into a cellular suspension.

The device 100 includes an evacuated collection container 10 comprised of (1) a tube 12 having an open end 14 and a closed end 16; a closure (e.g., stopper) 18 in the open end of the tube 12, and a predetermined level of vacuum (not shown) inside the container 10. It is preferred that the tube 12 is made of a transparent material such as glass or plastic for better visibility. It is also preferred that the tube 12 has an interior surface that is sterile and resists adherence to the cells 20 (not shown) during collection, storage, and analysis. The closure 18 is preferably puncturable by a needle and resealable allowing easy transfer of the cells 20 (e.g., the cells 20 from its host to the container 10 and from the container 10 to another substrate if desired). It is also preferred that the closure 18 and the tube 12 together form a seal capable of maintaining a pressure differential between atmospheric pressure and a pressure less than atmospheric pressure within the tube 12.

The size of the container 10 is not narrowly critical and is dependent upon the cell sample volume that is desired to be collected and preserved. For example, a typical size for the container 10 may have an internal volume of between 100 µl to 10 ml. The container 10 can be constructed using art-disclosed methods and is commercially available (e.g., VACUTAINER® Plus (safety engineered plastic break resistant blood collection tubes) with HEMOGUARD® closures (safety engineered closures featuring an integrated shield that prevents human contact with blood on the stopper or tube rim) available from Becton Dickinson and Company located in Franklin Lakes, N.J.; the evacuated sample collection tube described in U.S. Pat. No. 5,860,937, which is incorporated by reference). Of course, it should be understood that a wide range of changes and modifications can be made to the preferred embodiment described above for the container 10.

For preservation (e.g., fixation, stabilization and the like) of the cells 20, the device 100 further includes compounds 22 including an anticoagulant agent 24, a fixative agent 26 selected from the group consisting of: diazolidinyl urea, imidazolidinyl urea, dimethoylol-5,5-dimethylhydantoin, dimethylol urea, 2-bromo-2-nitropropane-1,3-diol, oxaizolidines, sodium hydroxymethyl glycinate, 5-hydroxymethoxymethyl-1-1aza-3, 7dioxabicyclo [3.3.0]octane, 5-hydroxymethyl-1-1aza-3,7-dioxabicyclo [3.3.0]octane, 5-hydroxypoly[methyleneoxy]methyl 1-1aza-3, 7-dioxabi cyclo [3.3.0]octane, and quaternary adamantine, and optionally a polyacrylic acid 28 or any suitable acid having a pH ranging from about one to about seven, wherein the compounds are in a sufficient amount to preserve the collected cells' original morphology and antigenic sites without significant dilution of the cells 20, and thereby allowing the cells 20, stored with the compounds 22, to be directly analyzed by a flow cytometer. It is preferred that the compounds 22 have been sterilized (e.g., by sterilizing filtration).

A suitable amount of any art-disclosed anticoagulant agent such as ethylene diamine tetra acetic acid (EDTA) and its salts, ethylene glycol tetra acetic acid (EGTA) and its salts, hirudin, heparin, citric acid, salts of citric acid, oxalic acid, salts of oxalic acid, or mixtures thereof may be used. A preferred anticoagulant agent 24 is $K_3EDTA$. The suitable amount of the anticoagulant agent 24 for the claimed subject matter is that effective to prevent coagulation of the cells 20 (e.g., whole blood) without causing significant dilution of the cells 20 (i.e., not clinically significant), and thereby allowing the cells 20, stored with the compounds 22, to be directly analyzed by a flow cytometer). For example, in a preferred embodiment, $K_3EDTA$ is the anticoagulant agent 24 and its concentration weight/volume is preferably less than about 0.3 g/ml, more preferably less than about 0.2 g/ml, and most preferably about less than about 0.15 g/ml.

The preferred fixative agent 26 is a heterocyclic urea (e.g., diazolidinyl urea (known as DU), imidazolidinyl urea (known as IDU) or a mixture thereof). The most preferred fixative agent is diazolidinyl urea. The suitable amount of the fixative agent 26 for the claimed subject matter is that effective to fix or stabilize the cells 20 without causing significant dilution of the cells 20 (i.e., not clinically significant), and thereby allowing the cells 20, stored with the compounds 22, to be directly analyzed by a flow cytometer. For example, in a preferred embodiment, diazolidinyl urea is the fixative agent 26 and its concentration weight/volume is preferably about less than about 1 g/ml, more preferably less than about 0.75 g/ml, and most preferably less than about 0.5 g/ml concentration of solution of DU before blood sample is added.

It is known that the acid 28 may rise signal to noise ratio during flow cytometry; and therefore, the acid 28 may be optionally added as one of the compounds 22 in the device 100. The preferred acid 28 is a polycarboxylic acid, and more preferably a polyacrylic acid with a molecular weight of 5,000. The suitable amount of the acid 28 for the claimed subject matter is that effective to rise signal to noise ratio during flow cytometry but without causing significant dilution to the cells 20 (i.e., not clinically significant) so that the cells 20, stored with the compounds 22, can be directly analyzed by a flow cytometry. For example, in a preferred embodiment, polyacrylic acid with a molecular weight of 5,000 is included in the container 10.

Additional compounds may optionally be added as one of the compounds 22 in the device 100. Such additional and optional compounds may include: cell permeabilizing agents for substantially gaining access to intracellular analytes/epitopes and/or for lysing red blood cells; proteins that substantially protect the cells during processing and/or substantially reduce non-specific binding of probes; serum/lipoproteins that substantially protect cells during processing and/or substantially reduce non-specific binding of probes; RNAse inhibitors which substantially inhibit digestion of RNA and/or substantially maintain RNA integrity; nucleic acid stabilizers which substantially inhibit the degradation of nucleic acids and nucleic acid containing compounds; amino acids/polypeptides which substantially enhance binding of probes/antibodies to epitopes and/or substantially increases the observable signal; fixatives which substantially preserve cell integrity especially for permeabilization agents, and may preserve some epitopes; anticoagulants which substantially decreases clotting of red blood cells, chelates calcium and/or may help maintain WBC integrity/viability; protease inhibitors which substantially decreases degradation of protein epitopes; antioxidants/reducing agents which substantially prevent hemolysis of red blood cells and/or substantially prevent oxidation of peptides, and/or substantially maintain epitopes; nucleic acid dyes that generally serve to label/identify nucleic acid; carbohydrates which substantially maintain cellular integrity and/or osmolarity; and, polyacrylic acids which substantially enhance the binding of probes and/or antibodies to epitopes; and/or substantially increases signal. One of skill in the art should be able to determine the usefulness and quantities of such optional compounds by routine testing and knowledge of the art. Within multiple specific embodiments the above additional and optional compounds may be more specifically include: Cell permeabilizing agents such as: DMSO (Dimethyl Sulfoxide), Ethylene glycol, Polyethylene glycol, Glycerin, Cellosolves (ethylene glycol dimethyl ether) (phenoxyethanol), TRITON® X 100, TRITON® X 705 (non-ionic detergents), 1-methyl-2-pyrrolidinone, TWEEN® 20, TWEEN® 40 (non-ionic surface active agents), BRIJ® 35 (detergent), Polyoxyethylene ether (Polyox), Sodium cholate, Ethylene oxide polymers, Monensin, Monactin, Pentachlorophenol, 2,4 dinitrophenol, saponin, SDS (sodium dodecyl sulfate); Proteins such as: Biotin, Albumins (egg, bovine), Gelatin, and similar such compounds as should be known to one of skill in the art; RNAse inhibitors such as: human placenta derived RNAse inhibitor, and similar such compounds should be known to one of skill in the art; Nucleic acid stabilizers such as: Guanidinium hydrochloride, Polycations such as Polyethylenimine), and similar such compounds as should be known to one of skill in the art; Amino acids/polypeptides such as: Glutamic acid, Glycine, Aspartic acid, and similar such compounds as should be known to one of skill in the art; Fixatives such as: Aldehydes (formaldehyde and glutaraldehyde), Alcohols (ethanol, methanol), and similar such compounds as should be known to one of skill in the art; Anticoagulants such as: EDTA (Ethylene Diamine Tetra acetic acid.), and similar such compounds as should be known to one of skill in the art; ACD (Acid Citrate Dextrose), Heparin, and similar such compounds as should be known to one of skill in the art; Protease Inhibitors such as: EDTA, PMSF (phenyl methyl sulfonyl fluoride), AEBSF (2-Aminoethyl benzene sulfonyl fluoride), and similar such compounds as should be known to one of skill in the art; Antioxidants/Reducing agents such as: TROLOX® antioxidant a water-soluble derivative of vitamin E), α-tocopherol, β-mercaptoethanol, and similar such compounds as should be known to one of skill in the art; Nucleic Acid Dyes such as: DAPI (Diamidino 2-phenylindole), Propidium Iodide, Fluorescein diacetate, and similar such compounds as should be known to one of skill in the art; Carbohydrates such as: Sugars (sucrose), cellulose, and similar such compounds as should be known to one of skill in the art. It should be appreciated that the above specific listings of compounds may contain a measure of overlap, which recognizes the sometimes-overlapping function of certain specific compounds. One of skill in the art should understand and appreciate this aspect of the disclosure.

The claimed subject matter allows the final composition 30 to be transported in ambient temperature. Thereafter, it is preferred that the final composition 30 be stored at temperature less than about 40° C. The cells 20 stored in the final composition 30 have more than about 3 days, preferably more than about 5 days, more preferably more than about 7 days stability. The claimed subject matter allows the cells 20 stored in the final composition 30 to be directly analyzed by a flow cytometer without further dilution and/or treatment because the compounds 22 can preserve the cells 20 without significantly diluting the cells 20. Any significant dilution of the cells 20 is likely to cause error in flow cytometry measurements (e.g., lowering the lymphocytes' count). To avoid significant dilution, the compounds 22 (comprising of the anticoagulant agent 24, the fixative agent 26, and optionally, the acid 28) are in concentrated forms, preferably in a ratio with the final composition 30 that is less than about 2:100, more preferably less than about 1.5:100, and most preferably less than about 1:100.

The device 100 may be included in a kit of the claimed subject matter containing components 32 (not shown) conventionally used to collect and analyze the cells 20 such as alcohol swab, gauze, tube holder, tourniquet, glove, other cell collection tube (with or without conventional cell analysis additives inside such tube), needle (with hub, part of a syringe assembly including barrel and plunger, or with wings connected via a hub and tubing to another needle for delivery to the device 100 or other collection tubes), lancet, adhesive strip, syringe, test strip (allowing the cells 20 to flow directly onto a glass or plastic strip containing reagents for cell analysis), glass or plastic strip containing reagents for cell analysis (e.g., immunoassay), packaging means (e.g., plastic bag, compartmentalized plastic enclosure, and the like) to store the desired components 32 and the device 100, and packaging means to transport the cells 20 stored in the device 100 after collection. It is preferred that the packaging means and any other components 32 that may become in physical contact with the cells 20 be sterilized and the packaging means is constructed to maintain this sterile environment.

Unlike the typical histological fixing agents, the fixative agent 26 of the claimed subject matter has extremely low toxicity. For example, toxicity studies comparing diazolidinyl urea with formaldehyde of the prior art show the following:

|  | Inhalation Toxicity | Dermal Toxicity | LD50 |
| --- | --- | --- | --- |
| Formaldehyde | 500 mg/kg | 270 mg/kg | 800 mg/kg |
| Diazolidinyl urea | None | 2000 mg/kg | 2570 mg/kg |

This reduced toxicity makes disposal and handling less of a problem. In addition, since there is no inhalation toxicity, there are no badge detection devices required as there are for formaldehyde.

Another advantage offered by the fixative agent 26 is the fact that it is not flammable and therefore does not present a fire hazard as do many of the prior art fixative agents.

The mechanism by which the fixative agent 26 provides the desired tissue and cell membrane stabilization is not known for certain. It is believed that the fixative agent binds in some fashion to the cell membrane or tissue. This hypothesis is drawn because many members of the active agent are known disinfectants, which kill bacteria by binding to cell structure. This is not a full explanation of the mechanism responsible for the results of the claimed subject matter since many other disinfectants such as KATHON® (water-based microbicides for protection against bacteria) and OMADINE® (broad spectrum microbial (fungicide-algaecide) agents) fail to provide tissue and cell stabilizing effects.

The ability of the fixative agent 26 to preserve antigenic sites is also not understood but it is probably due to a difference in the reaction between proteins and the fixative agent 26 compared to prior art preservatives such as formaldehyde. Formaldehyde cross-links with itself and proteins to obscure the antigen. To determine if this is true, diazolidinyl urea was added to the protein, albumin. After incubation of the diazolidinyl urea and protein mixture for 24 hours, disc-gel electrophoresis indicated no change in the rate of migration of the protein. When this experiment is conducted with formaldehyde, a large number of insoluble proteins result and the electrophoretic migration is altered.

Figure 2:
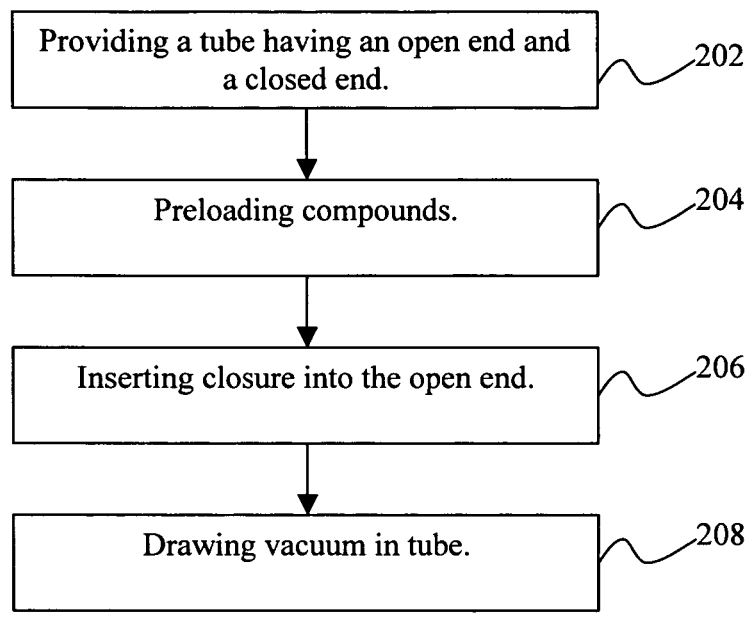
FIG. 2 A flow diagram illustrating a method for making the collection device illustrated in the FIG. 1.

Referring to FIG. 2, a method of making the device 100 of the claimed subject matter is comprised of providing the tube 12 having the open end 14 and the closed end 16 (202). It is preferred that the tube 12 is sterile. The method is further comprised of preloading (i.e., introducing) the compounds 22 comprising of the anticoagulant agent 24, the fixative agent 26, and optionally the acid 28 into the tube 12 using art-disclosed methods (204). The types and amounts of the anticoagulant agent 24, the fixative agent 26, and optionally, the acid 28 including the ratio between the compounds 22 and the final composition 30 are the same as described above for the device 100 of the claimed subject matter. It is preferred the compounds have been sterilized (e.g., by sterile filtration). The method of the preloading step 204 may optionally include freeze drying the compounds in the tube 12. The method 200 further includes inserting the closure 18 into the open end 14 of the tube 12 (206). The method 200 further includes drawing a vacuum inside the tube 12 to a predetermined level (208) using art-disclosed methods. The amount of vacuum to be drawn is dependent upon the nature and volume of the cells desired to be collected and preserved. For example, for whole blood collection, the vacuum should be drawn to a level that allows the pressure of the whole blood to cause it to flow into and fill the tube 12 to the desired level. The method 200 may optionally include providing the components 32 conventionally used to collect and analyze the cells 20. The components 32 are the same as for the device 100 of the claimed subject matter as described above.

The method may also optionally include collecting the cells 20 using art-disclosed methods (e.g., venipuncture, use of a lancet, etc.). It may optionally include screening the cells 20 using art-disclosed instruments such as flow cytometers (eg., FACScan, FACSCalibur by BD and EPICS by Beckman Coulter), other hematology instruments (e.g., H3 by Bayer Corporation, the Beckman Coulter STKS or Gen-S Systems, the Abbott Cell-Dyn 4000 Hematology System, Bayer ADVIA 120 System, the Sysmex XE2100 System, and the like. The screening of the cells may be for any purpose including, without limitation, for HIV, HPV, hepatitis, leukemia, cancer, and the like; other art-disclosed screening such as immunoassay, AIDS panel, and the like; and screening by methods disclosed in commonly U.S. Pat. No. 4,788,139 (Ryan) titled "Platelet aggregation reagent, reagent container and method of determining platelet aggregation in EDTA-anticoagulated blood", which is hereby incorporated by reference. Cells 20 collected and preserved using the claimed subject matter may undergo histological study in any known conventional manner, such as through the use of paraffin sectioning equipment, staining, mounting on slides, or other common steps utilized prior to microscopic or other examination. The claimed subject matter thus provides a safe, convenient, and effective solution to collect and preserve cells for analysis.

It should be noted that the method and device of the claimed subject matter may be used by those skilled in the art to preserve antigenic sites on or within cells (or components thereof) derived from any source including normal blood, bone marrow, lymph, or solid tissues, or may be derived from abnormal tissues such as leukemias or solid tissue cancers. The claimed subject matter may also be utilized with any cellular component or biological material that has at least one antigenic site.

It should be noted that in preferred embodiments of the claimed subject matter cell clumping is prevented, light scattering properties are preserved, antigenic sites are preserved, and nucleic acids may be analyzed.

The foregoing detailed description has discussed only a few of the many forms that the claimed subject matter can take. For this reason, this detailed description is intended only by way of illustration. It is only the following claims, including all equivalents that are intended to define the scope of the claimed subject matter.

What is claimed is:

1. A method for collecting mammalian blood cells, comprising steps of:
   (a) providing a tube including preloaded compounds consisting of (i) ethylene diamine tetra acetic acid (EDTA) and (ii) diazolidinyl urea, the tube having an open end and a closed end that receives cells collected directly from a blood draw and wherein a majority of an interior portion of the tube is substantially free of contact with the preloaded components;
   (b) drawing a blood sample containing a plurality of blood cells into the tube whereby it contacts the preloaded compounds to yield a final composition, wherein a ratio of a volume of the preloaded compounds to a combined volume of the blood sample and the preloaded compounds is from about 1:100 to about 2:100, and so that the plurality of blood cells of the blood sample are stabilized directly and immediately upon the blood draw; and
   (c) transporting the blood sample, wherein the blood sample is drawn and transported in the same tube with no processing steps between the blood draw and transporting.

2. The method of claim 1, wherein a concentration of said EDTA preloaded in said tube is less than 0.3 g of EDTA per ml of the preloaded compounds.

3. The method of claim 1, further comprising a step of sterilizing said preloaded compounds prior to the preloading step.

4. The method of claim 1, further comprising a step of providing at least one component selected from the group consisting of an alcohol swab, a gauze, a tube holder, a tourniquet, a glove, other cell collection tube, a needle, a lancet, an adhesive strip, a syringe, a test strip, a strip containing reagents for cell analysis, a packaging means for storing said at least one component and said tube to form a kit, and a packaging means for transporting said tube immediately upon the blood draw.

5. A method for preparing blood cells for analysis, said method comprising steps of:
   (a) providing a closed collection container, said collection container having an internal pressure less than atmospheric pressure outside said container, wherein said collection container contains preloaded compounds consisting of:
   (i) ethylene diamine tetra acetic acid (EDTA); and
   (ii) diazolidinyl urea; and
   wherein a majority of an interior portion of the collection container is substantially free of contact with the preloaded components; and
   (b) drawing a blood sample containing the blood cells into the collection container whereby the blood sample contacts the preloaded compounds to yield a final composition, wherein after collection of the blood cells in the container, a ratio of a volume of the preloaded compounds to a volume of the final composition is from about 1:100 to about 2:100.

6. The method of claim 5, wherein a concentration of said diazolidinyl urea preloaded in said collection container is less than about 0.5 g of diazolidinyl urea per ml of the preloaded compounds.

7. A method for preparing blood cells for analysis, said method comprising:
   (a) providing a collection container for receiving a whole blood sample;
   (b) introducing into the collection container preloaded compounds consisting of:
   (i) ethylene diamine tetra acetic acid (EDTA); and
   (ii) diazolidinyl urea;
   (c) evacuating the collection container to an internal pressure that is less than atmospheric pressure outside said collection container;
   (d) drawing a volume of the whole blood sample into the collection container, wherein a majority of an interior portion of the collection container is substantially free of contact with the preloaded compounds and whereby the whole blood sample contacts the preloaded compounds to yield a final composition, wherein a ratio of a volume of the preloaded compounds to a volume of the final composition is from about 1:100 to about 2:100.

8. The method of claim 7, said method further comprising storing the whole blood sample at ambient temperature in the collection container after contacting with the preloaded compounds and prior to any analyzing step.

9. The method of claim 8, wherein said whole blood sample is stored at ambient temperature for a period of at least 3 days prior to any analyzing step.

10. The method of claim 7, said method further comprising transporting the whole blood sample at ambient temperature in the collection container from a collection site to an analysis site.

11. The method of claim 3, wherein the sterilizing step includes sterile filtration.

12. The method of claim 1, wherein a concentration of the diazolidinyl urea is less than about 0.5 g/ml before the blood draw.

13. The method of claim 1, wherein the transporting step occurs in ambient temperature.

14. The method of claim 1, further comprising analyzing the blood sample of step (c) by a flow cytometer without further dilution and/or treatment.

15. The method of claim 1, further comprising screening the blood sample of step (c) for HIV.

16. The method of claim 1, wherein the tube includes a closure, and the closure and the tube together form a seal capable of maintaining a pressure differential between atmospheric pressure and a pressure less than atmospheric pressure within the tube.

17. The method of claim 5, wherein the tube has an interior surface that is sterile and resists adherence to the blood cells during collection, storage, and analysis.

18. The method of claim 17, where the preloaded compounds are sterilized by sterile filtration.

19. The method of claim 7, further comprising analyzing the drawn blood sample by a flow cytometer without further dilution and/or treatment.

20. The method of claim 7, further comprising screening the drawn blood sample for HIV.

* * * * *